Patented May 26, 1942

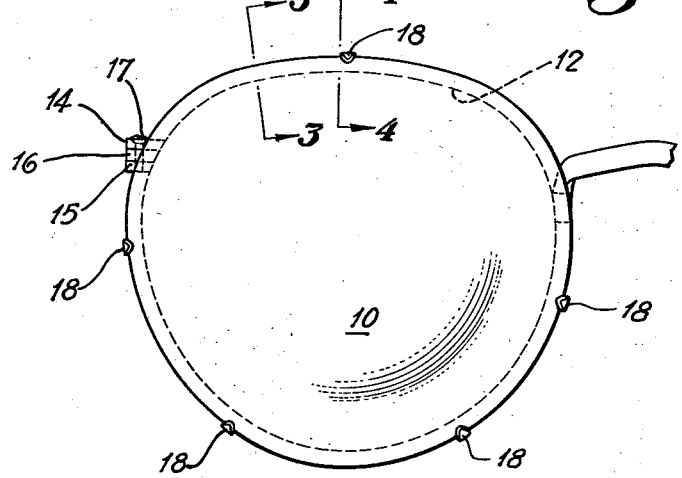
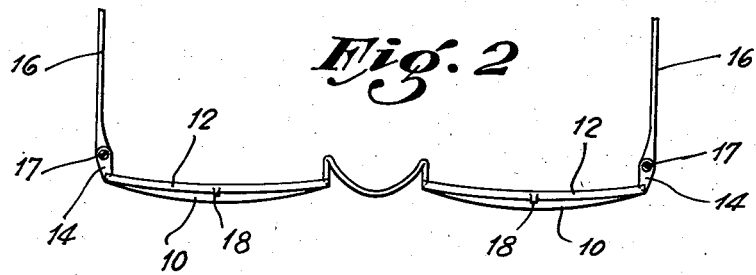
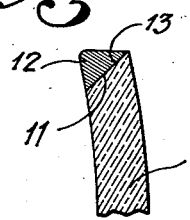 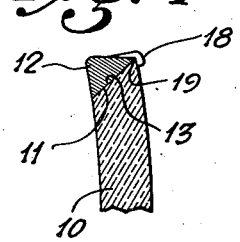 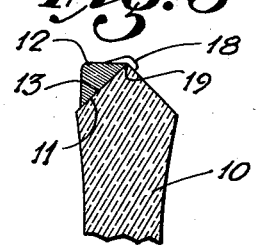

2,284,262

UNITED STATES PATENT OFFICE 2,284,262

SPECTACLE MOUNTING

Wesley R. Churchill, Hollywood, Calif.

Application February 13, 1940, Serial No. 318,715

1 Claim. (Cl. 88—47)

This invention relates to a spectacle mounting.

At the present time the trend in the design of spectacle mountings is toward a mounting which provides a rigid frame structure including a bridge piece, temples and an intermediate frame structure. Some of the more popular mountings rigidly connect the bridge piece with the temples and support the lens pieces from the bridge only. These structures provide a semi-visible frame element extending from the bridge to the temples and partially around the lens so that the lenses appear for the most part rimless. It has been found, however, that in wearing this type of spectacle in which the lenses are supported by a single screw attaching them to the bridge that due to the cantilever support vibration loosens the lens, and in some instances has rendered the wearing of this type of mounting objectionable. This is particularly true when heavy minus lenses are used. It is the principal object of the present invention, therefore, to provide a rigid spectacle mounting which includes a bridge and complete lens rims of such design and construction as to provide a rigid support for the lens upon the bridge and to be so disposed with relation to the perimeter of the lens as to be substantially invisible, the structure lending itself for use in spectacle mountings of the regular type having temples, or finger piece or nose piece mountings now in use, the structure being adaptable to all shapes of lenses commonly used in the optical profession.

The present invention contemplates the provision of a lens, the marginal edge of which is beveled at least rearwardly, thus distinguishing it from ordinary lenses having a flat ground edge, and which lens is fitted with a rim following the contour of the rear beveled face of the lens, whereby light refraction of the beveled edge will act to render the rim invisible, and which rim carries a plurality of minute grooved prongs extending over the edge of the lens to hold the lens rigidly in position while the rim is substantially concealed in the rear of the beveled face. The rims are attached to a bridge and may be provided at the opposite sides of the lens with temple bars.

The invention is illustrated by way of example in the accompanying drawing, in which:

Figure 1 is a view in front elevation showing the application of the present invention to the lens of a pair of glasses with parts broken away for the sake of convenience.

Fig. 2 is a view in plan showing a pair of glasses fitted with temple bars and indicating the relationship of the rims to the edge of the glasses and the formation of the temple joint members.

Fig. 3 is an enlarged fragmentary view in section as seen on the line 3—3 of Fig. 1 and discloses the beveled edge of the lens in the rim in which the rim element fits.

Fig. 4 is an enlarged fragmentary view in section as seen on the line 4—4 of Fig. 1 and shows the relationship of the fastening prong to the beveled edge of the lens.

Fig. 5 is an enlarged fragmentary view taken through a lens and a rim in which structure the invention is adapted for use in a minus lens.

Referring more particularly to the drawing, 10 indicates the lenses of a pair of spectacles of the regular type or with a finger piece. These lenses may be of any desired shape and design. It is to be understood that the structure is adaptable for use with any type of lenses and that the rims may be easily varied to perform their intended function regardless of the design of the perimeter of the lens. As shown in Fig. 1 the lens is of a conventional type. In any event the lens is preferably ground with a rearwardly beveled marginal edge 11, as shown in Figs. 3 and 4 of the drawing. In some instances the lens may be beveled forwardly and rearwardly as shown in Fig. 5 of the drawing, where a heavy minus lens is disclosed. It will be recognized that in connection with the ordinary lens having a flat ground marginal edge there is the usual refraction of light which is discernible when rimless glasses are used. When, however, the marginal edge of a lens is ground with the beveled face 11 inclined rearwardly there will also be a refraction around the edge of the lens. Advantage is taken of that refraction in the present instance to conceal the rim 12 of which the present invention is particularly concerned. This rim is a relatively fine bead of small cross-section and is preferably provided with an inclined face 13 complementary to the face 11 on the lens. Throughout the perimeter of the lens the outer dimension of the rim 12 is substantially the same or less than the outer dimension of the contour of the lens, thus the rim normally lies in the rear of the beveled face 11 and is concealed by the refraction of light produced by the inclined beveled edge 11 of the lens. The rim conforms to the complete contour of the lens and its opposite ends terminate in the lugs 14 and 15 providing the joint for a temple bar 16. A screw 17 is used to draw the lugs 14 and 15 together, thus tightening the rim around the entire perimeter of the lens and also affording a pivot for the temple bar 16.

In order to hold the lens in position with relation to the rim when the rim is clamped around the marginal edge thereof the lens is formed with a plurality of small prongs 18 which cooperate with the rims to form a groove 19. The prongs extend over the marginal edge of the rim to embrace the same and extend down a small distance over the front face of the lens to sufficiently grip and hold it. Any number of these prongs may be provided depending upon the type of lens being mounted in the rim. In the case of rims of polygon shape the prongs may be provided at the corners produced by the sides of the polygon, and in the case of oval or circular lenses the prongs may be suitably distributed to afford a sufficient gripping action. It will be evident that the selection of the location of the prongs may best be made with a view to placing them in the most inconspicuous position. It will further be seen that with the rim being concealed in the rear of the beveled face, the edge of the lens and the prongs being spaced therearound, the lens will be held rigidly with relation to the bridge and the temple bar and will not be subject to any strain. It is also to be pointed out that by the use of this mounting it is not intended to secure the lens to the rim adjacent the bridge with screws which often cause the lens to break when under strain.

It will be seen in Fig. 2 of the drawing that the lugs 14 and 15 forming the joint for the temple bar 16 curve rearwardly adjacent the edge of the lens in a graceful manner and are substantially disposed in the rear of the lens where they will be unobtrusive to the view.

It is to be understood that the grooves 19 may be formed at a sharp angle to agree with the exact angle of the bevel of the edge faces 11 and that the exact marginal edge of the lens may be rounded with an appropriate curve being formed in the groove 19 of the prong.

In preparing eyeglasses for use embodying the present mounting a lens of a particular shape is selected and a rim formed having an appropriate shape conforming to the contour of the lens. It has been pointed out that the edge of the rim has been beveled rearwardly as indicated at 11. If desired the rim might be beveled forwardly and the rim placed in front of the lens. The rim may be made out of a relatively fine length of steel and may be plated or gold filled as desired. The finish of the rim, of course, is not concerned with the present invention. The rims may then be placed in position with the prongs extending over the extreme marginal edges of the lenses. In some instances where thick glasses are required, such as those having minus lenses, the marginal edges may be beveled oppositely, as indicated in Fig. 5. In that event, however, the mounting with the prongs will be the same in function and substantially the same in shape. When the rims are clamped in position by the screws 17 the marginal edge of the rim will fit within the grooves 19 formed by the rim 12 and the prong 18, thus holding the lens in position.

It will thus be seen that due to the construction here disclosed this spectacle mounting will be sightly in appearance, since the rim of the spectacle frame will be substantially invisible. It is also to be pointed out that the structure will be durable and serviceable due to the fact that even though the spectacles will have the appearance of rimless lenses they will be provided with a full rim mounting which will positively engage the lens and hold it in position. This mounting insures that there will be relatively small strain upon the lens since no screws pass through the lens, and since the strains will be imparted directly to the rims, the bridge and the temple bars. It will also be seen that due to the arrangement here disclosed there is no opportunity for the lenses to become loose due to vibration, which would tend to throw the lenses off axis and center, producing a detrimental effect upon the eyes of the wearer as well as appearance of the wearer. Furthermore, it is to be pointed out that since the rims are disposed on the inner edges of the lens and also substantially cover the complete margin described by the beveled faces of the lenses the lenses are protected from chipping or breakage due to ordinary causes.

While I have shown the preferred form of my invention as now known to me, it is to be understood that various changes may be made in the combination, construction and arrangement of parts by those skilled in the art without departing from the spirit of the invention as claimed.

Having thus described my invention, what I claim and desire to secure by Letters Patent is:

A spectacle structure, comprising a lens, the perimeter of which is formed with a bevel rearwardly and inwardly from the forward face of the lens to the rear face, a rim adapted to embrace the perimeter of said lens and lie along said beveled face, the section of said rim being triangular, whereby the outer perimeter of the rim will agree in dimensions and contour with the perimeter of the lens as defined by the forward face thereof, the rim having a beveled face complementary to the beveled face of the lens and lying thereagainst, the rear face of the rim lying in the plane of the rear surface of the lens, prongs carried by the rim at spaced intervals along its perimeter and hooking forwardly over the edge of the front face of the lens whereby the rim and lens will be held in intimate fixed contact, the rim being interrupted at a point in its perimeter, the contiguous edges thereof being spaced from each other, lugs extending laterally from said contiguous ends and to which a temple bar is pivoted, and a screw passing through the lugs and a temple bar, whereby the rim will be drawn tightly around the lens and the temple bar will be pivotally held.

WESLEY R. CHURCHILL.